(12) United States Patent
Habchi et al.

(10) Patent No.: US 12,104,556 B1
(45) Date of Patent: Oct. 1, 2024

(54) BLOCKER DOOR RETENTION ASSEMBLY FOR AN AIRCRAFT PROPULSION SYSTEM THRUST REVERSER

(71) Applicant: Rohr, Inc., Chula Vista, CA (US)

(72) Inventors: Jason Habchi, San Diego, CA (US); Jihad I. Ramlaoui, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/244,634

(22) Filed: Sep. 11, 2023

(51) Int. Cl.
  *F02K 1/76* (2006.01)
  *F02K 1/72* (2006.01)
(52) U.S. Cl.
  CPC ............ *F02K 1/766* (2013.01); *F02K 1/72* (2013.01); *F02K 1/763* (2013.01); *F05D 2220/323* (2013.01); *F05D 2260/50* (2013.01)
(58) Field of Classification Search
  CPC . F02K 1/766; F02K 1/72; F02K 1/763; F05D 2220/323; F05D 2260/50
  See application file for complete search history.

(56) References Cited

U.S. PATENT DOCUMENTS

| 4,564,160 | A | * | 1/1986 | Vermilye | F02K 1/76 239/265.29 |
|---|---|---|---|---|---|
| 11,378,037 | B2 | | 7/2022 | Song | |
| 2016/0326985 | A1 | * | 11/2016 | Hercock | F02K 1/625 |
| 2022/0186684 | A1 | | 6/2022 | Peyron | |

* cited by examiner

*Primary Examiner* — Steven M Sutherland
(74) *Attorney, Agent, or Firm* — Getz Balich LLC

(57) ABSTRACT

A thrust reverser includes a fixed thrust reverser structure, a translating sleeve, and a blocker door assembly. The fixed thrust reverser structure includes a wall. The translating sleeve is configured to translate between a first stowed translating sleeve position and a second translating sleeve position. The blocker door assembly includes a plurality of blocker doors. Each blocker door of the plurality of blocker doors includes a blocker door body, at least one hinge, and a blocker door retention assembly. The blocker door body is pivotable about a hinge line of the at least one hinge between a first stowed blocker door position and a second blocker door position. The blocker door retention assembly includes a first retention body fixedly mounted to the wall or to the translating sleeve. The first retention body is configured to support the blocker door body in the first stowed blocker door position.

19 Claims, 9 Drawing Sheets

BLOCKER DOOR RETENTION ASSEMBLY FOR AN AIRCRAFT PROPULSION SYSTEM THRUST REVERSER

BACKGROUND

1. Technical Field

This disclosure relates generally to a thrust reverser for an aircraft propulsion system and, more particularly, to a blocker door retention assembly for a blocker door of the thrust reverser.

2. Background Information

Aircraft propulsion systems may include thrust reversers configured for redirecting air flow in an at least partially forward direction to generate reverse thrust for the propulsion system. Some thrust reversers include blocker doors configured for selectively changing position to control the direction of the air flow. Various systems are known in the art for controlling the movement of these blocker doors. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a thrust reverser for an aircraft propulsion system includes a fixed thrust reverser structure, a translating sleeve, and a blocker door assembly. The fixed thrust reverser structure includes a wall extending circumferentially about an axis of the thrust reverser. The translating sleeve extends circumferentially about the axis to form a thrust reverser duct of the thrust reverser. The translating sleeve is configured to translate between a first stowed translating sleeve position and a second translating sleeve position. The translating sleeve includes an upstream end. The upstream end is disposed at the wall with the translating sleeve in the first stowed translating sleeve position. The blocker door assembly includes a plurality of blocker doors. Each blocker door of the plurality of blocker doors includes a blocker door body, at least one hinge, and a blocker door retention assembly. The blocker door body is pivotably mounted to the translating sleeve by the at least one hinge. The blocker door body is pivotable about a hinge line of the at least one hinge between a first stowed blocker door position and a second blocker door position. Translation of the translating sleeve from the first stowed translating sleeve position to the second translating sleeve position effects pivoting of the blocker door body from the first stowed blocker door position to the second blocker door position. The blocker door retention assembly includes a first retention body fixedly mounted to the wall or to the translating sleeve. The first retention body is configured to support the blocker door body in the first stowed blocker door position.

In any of the aspects or embodiments described above and herein, the first retention body may be configured to release the blocker door body in the second blocker door position.

In any of the aspects or embodiments described above and herein, the first retention body may be fixedly mounted to the translating sleeve. The blocker door retention assembly may further include a second retention body fixedly mounted to the blocker door body. The first retention body may be configured to engage the second retention body with the blocker door body in the first stowed blocker door position.

In any of the aspects or embodiments described above and herein, with the blocker door body in the first stowed blocker door position, the second retention body may be spaced from the first retention body by a gap.

In any of the aspects or embodiments described above and herein, the first retention body may include a pin and the second retention body may extend about the pin with the blocker door body in the first stowed blocker door position.

In any of the aspects or embodiments described above and herein, the pin may extend along the hinge line.

In any of the aspects or embodiments described above and herein, the second retention body may include a hook extending about the pin and spaced from the pin by the gap.

In any of the aspects or embodiments described above and herein, the second retention body may surround the pin.

In any of the aspects or embodiments described above and herein, the first retention body may be fixedly mounted to the wall at a radial position of the blocker door body in the first stowed blocker door position. The first retention body may be configured to engage the blocker door body with the blocker door body in the first stowed blocker door position.

In any of the aspects or embodiments described above and herein, the first retention body may extend between and to a first end and a second end. The first end may be fixedly mounted to the wall. The first retention body may include a retention axial portion at the second end. The retention axial portion may be spaced from the blocker door body by a gap with the blocker door body in the first stowed blocker door position.

In any of the aspects or embodiments described above and herein, the at least one hinge may include a first lateral hinge and a second lateral hinge. The first retention body may be disposed circumferentially between the first lateral hinge and the second lateral hinge.

In any of the aspects or embodiments described above and herein, the thrust reverser may further include an inner fixed structure forming an inner radial boundary of the thrust reverser duct. Each blocker door of the plurality of blocker doors may further include a drag link pivotably mounted to the inner fixed structure and the blocker door body.

According to another aspect of the present disclosure, a thrust reverser for an aircraft propulsion system includes a torque box, a translating sleeve, and a blocker door assembly. The torque box includes a wall extending circumferentially about an axis of the thrust reverser. The translating sleeve is disposed aft of the torque box. The translating sleeve is configured to translate between a forward translating sleeve position and an aft translating sleeve position. The blocker door assembly includes a plurality of blocker doors. Each blocker door of the plurality of blocker doors includes a blocker door body, at least one hinge, and a blocker door retention assembly. The blocker door body is pivotably mounted to the translating sleeve by the at least one hinge. The blocker door body is pivotable about a hinge line of the at least one hinge between a first stowed blocker door position and a second blocker door position. Translation of the translating sleeve from the first stowed translating sleeve position to the second translating sleeve position effects pivoting of the blocker door body from the first stowed blocker door position to the second blocker door position. The blocker door retention assembly includes a first retention body and a second retention body. The first retention body is fixedly mounted to the translating sleeve. The second retention body is fixedly mounted to the blocker door body. The first retention body is configured to engage the second retention body to support the blocker door body in the first stowed blocker door position.

In any of the aspects or embodiments described above and herein, the first retention body may extend between and to a first end and a second end. The first end may be fixedly mounted to the translating sleeve. The second end may be disposed at the hinge line.

In any of the aspects or embodiments described above and herein, the second end may be disposed axially forward of the first end.

In any of the aspects or embodiments described above and herein, the first retention body may be mounted to the translating sleeve at an upstream end of the translating sleeve.

In any of the aspects or embodiments described above and herein, the first retention body may be spaced from the second retention body by a gap with the blocker door body in the first stowed blocker door position.

In any of the aspects or embodiments described above and herein, the first retention body may include a pin at the second end. The pin may extend along the hinge line. The pin may be configured to engage the second retention body to support the blocker door body in the first stowed blocker door position.

According to another aspect of the present disclosure, a thrust reverser for an aircraft propulsion system includes a fixed thrust reverser structure, a translating sleeve, and a blocker door. The fixed thrust reverser structure includes a wall extending circumferentially about an axis of the thrust reverser. The translating sleeve extends circumferentially about the axis to form a thrust reverser duct of the thrust reverser. The translating sleeve is configured to translate between a first stowed translating sleeve position and a second translating sleeve position. The translating sleeve includes an upstream end. The upstream end is disposed at the wall with the translating sleeve in the first stowed translating sleeve position. The blocker door includes a blocker door body, at least one hinge, and one or more blocker door retention assemblies. The blocker door body is pivotably mounted to the translating sleeve by the at least one hinge. The blocker door body is pivotable about a hinge line of the at least one hinge between a first stowed blocker door position and a second blocker door position. Translation of the translating sleeve from the first stowed translating sleeve position to the second translating sleeve position effects pivoting of the blocker door body from the first stowed blocker door position to the second blocker door position. Each of the blocker door retention assemblies includes a first retention body and a second retention body. The first retention body is fixedly mounted to the wall or to the translating sleeve. The blocker door body includes the second retention body. The first retention body is configured to support the blocker door body such that, in an unfailed condition of the blocker door, the first retention body is spaced from the second retention body by a gap for the first stowed blocker door position and the second blocker door position and, in a failed condition of the blocker door, the first retention body contacts the second retention body for the first stowed blocker door position.

In any of the aspects or embodiments described above and herein, in the failed condition of the blocker door, the first retention body is configured to release the second retention body in the second blocker door position.

The present disclosure, and all its aspects, embodiments and advantages associated therewith will become more readily apparent in view of the detailed description provided below, including the accompanying drawings.

DETAILED DESCRIPTION

Figure 1:
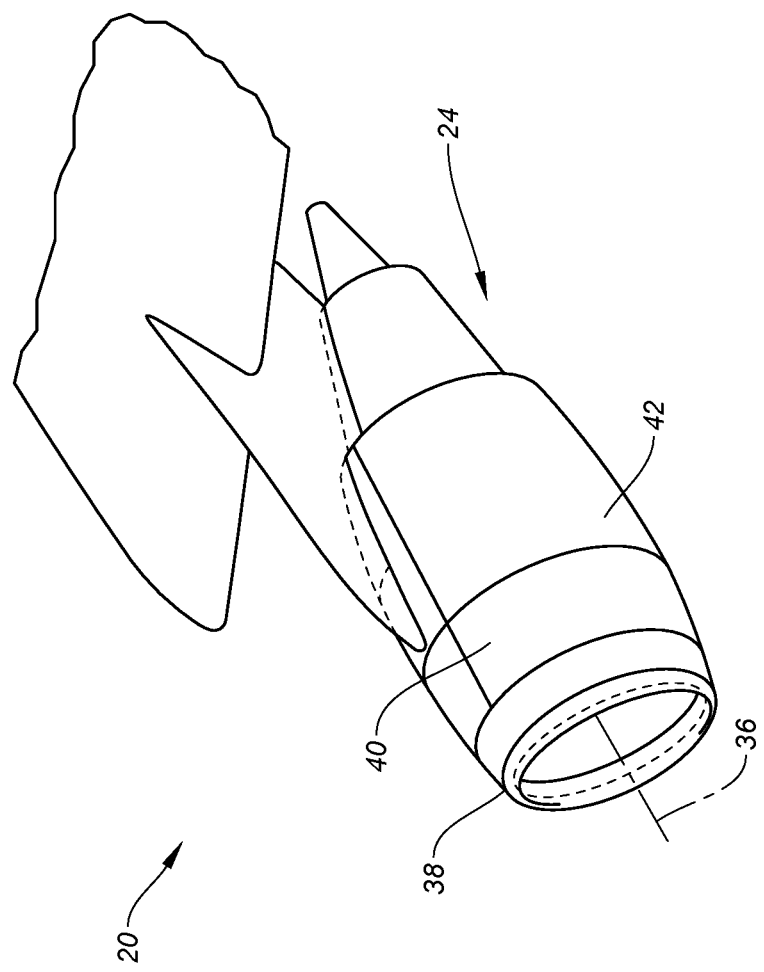
FIG. 1 illustrates a perspective view of an aircraft propulsion system, in accordance with one or more embodiments of the present disclosure.
Figure 2:
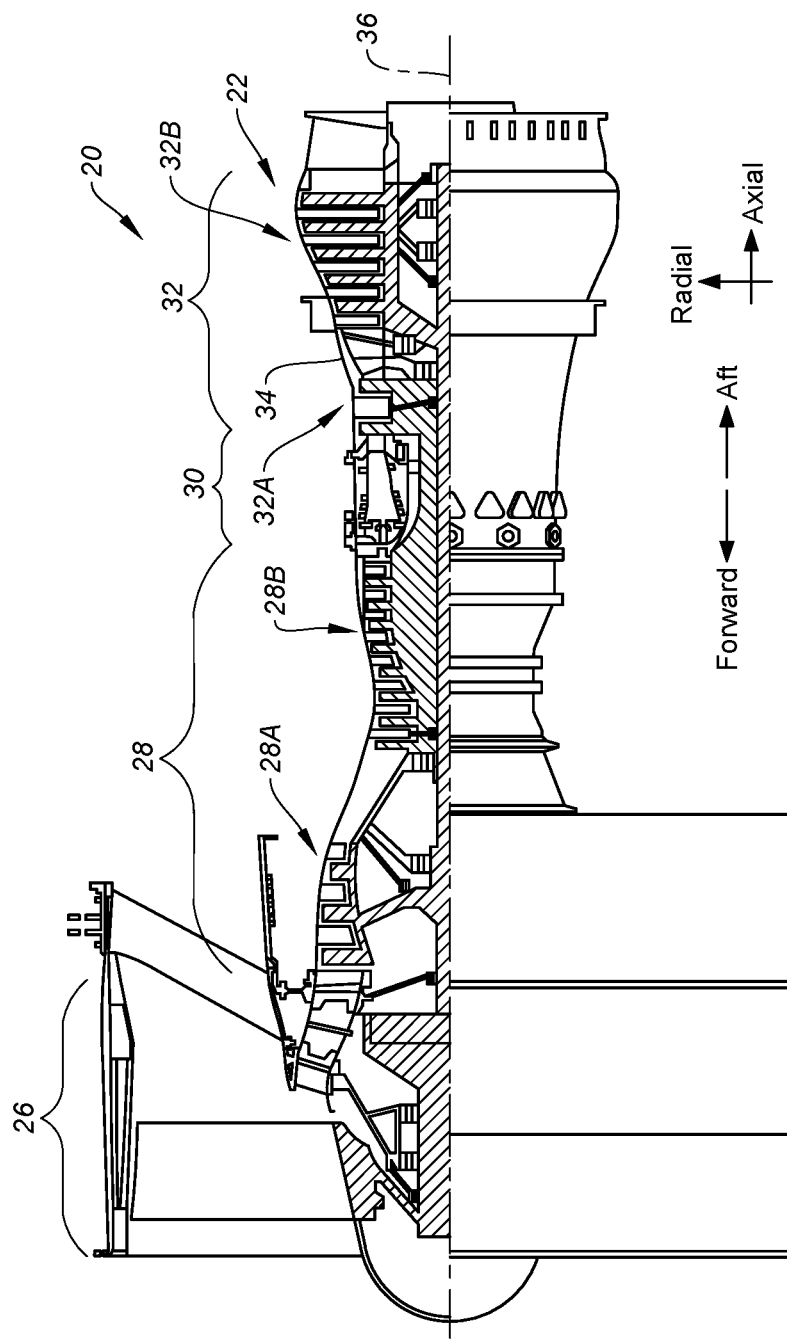
FIG. 2 illustrates a cutaway view of a gas turbine engine for an aircraft propulsion system, in accordance with one or more embodiments of the present disclosure.

FIGS. 1 and 2 illustrate a propulsion system 20 for an aircraft. The propulsion system 20 includes a gas turbine engine 22 and a nacelle 24. This gas turbine engine 22 may be configured as a high-bypass turbofan engine. Alternatively, the gas turbine engine 22 may be configured as any other type of gas turbine engine capable of propelling the aircraft during flight.

The gas turbine engine 22 of FIG. 2 includes a fan section 26, a compressor section 28, a combustor section 30, a turbine section 32, and an engine static structure 34. The gas turbine engine 22 sections 26, 28, 30, 32 of FIG. 1 are arranged sequentially along an axial centerline 36 (e.g., a rotational axis) of the gas turbine engine 22. The compressor section 28 may include a low-pressure compressor (LPC) 28A and a high-pressure compressor (HPC) 28B. The turbine section 32 may include a high-pressure turbine (HPT) 32A and a low-pressure turbine (LPT) 32B. The present disclosure, however, is not limited to the particular gas turbine engine 22 configuration of FIG. 2.

The engine static structure 34 may include, for example, one or more engine cases for the gas turbine engine 22. The engine static structure 34 may additionally include cowlings, bearing assemblies, and/or other structural components of the gas turbine engine 22. The one or more engine cases form, house, and/or structurally support components of the gas turbine engine 22 sections 26, 28, 30, 32.

The nacelle 24 is configured to house and provide an aerodynamic cover for the gas turbine engine 22. The nacelle 24 of FIG. 1 generally includes an air intake 38, a fan cowl 40, and a thrust reverser 42. At least a portion of the thrust reverser 42 may be configured to move (e.g., axially translate) relative to the air intake 38 and the fan cowl 40.

Figure 3:
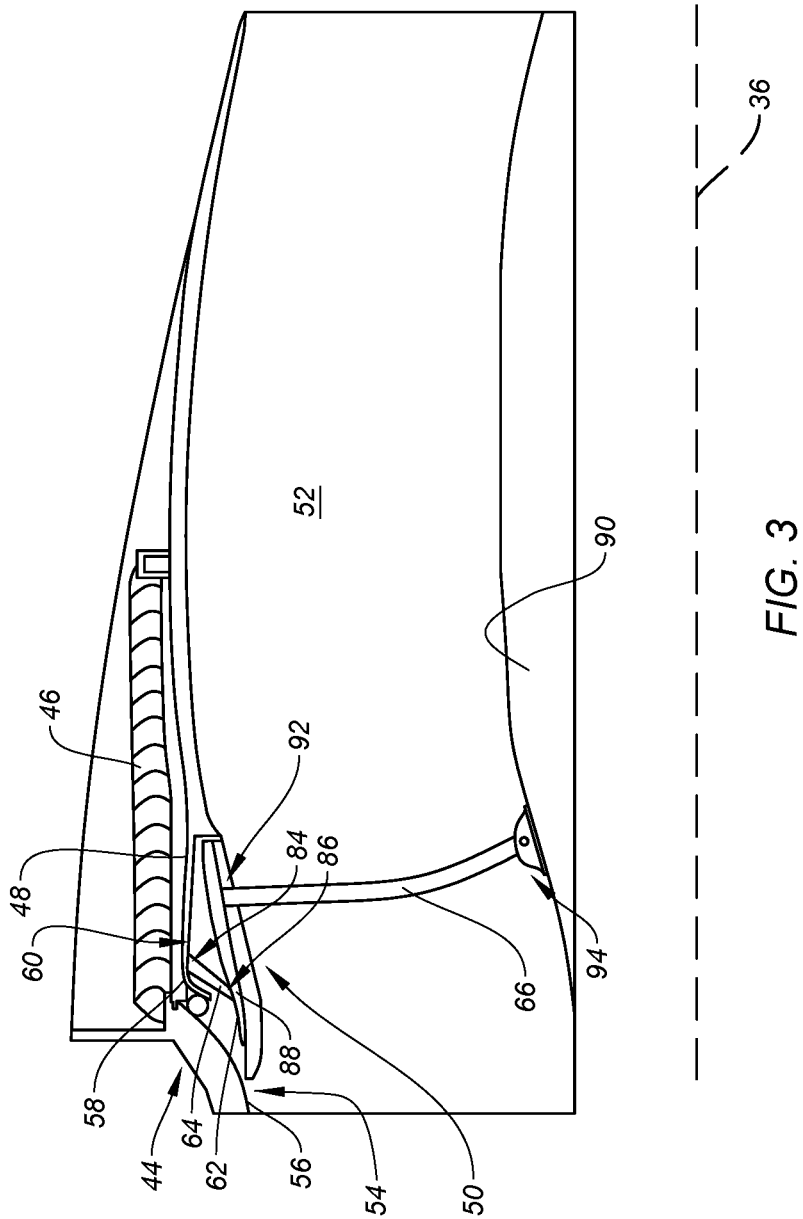
FIG. 3 illustrates a cutaway view of a portion of a thrust reverser for an aircraft propulsion system, the thrust reverser including a translating sleeve and a blocker door assembly, and the translating sleeve in a stowed position, in accordance with one or more embodiments of the present disclosure.
Figure 4:
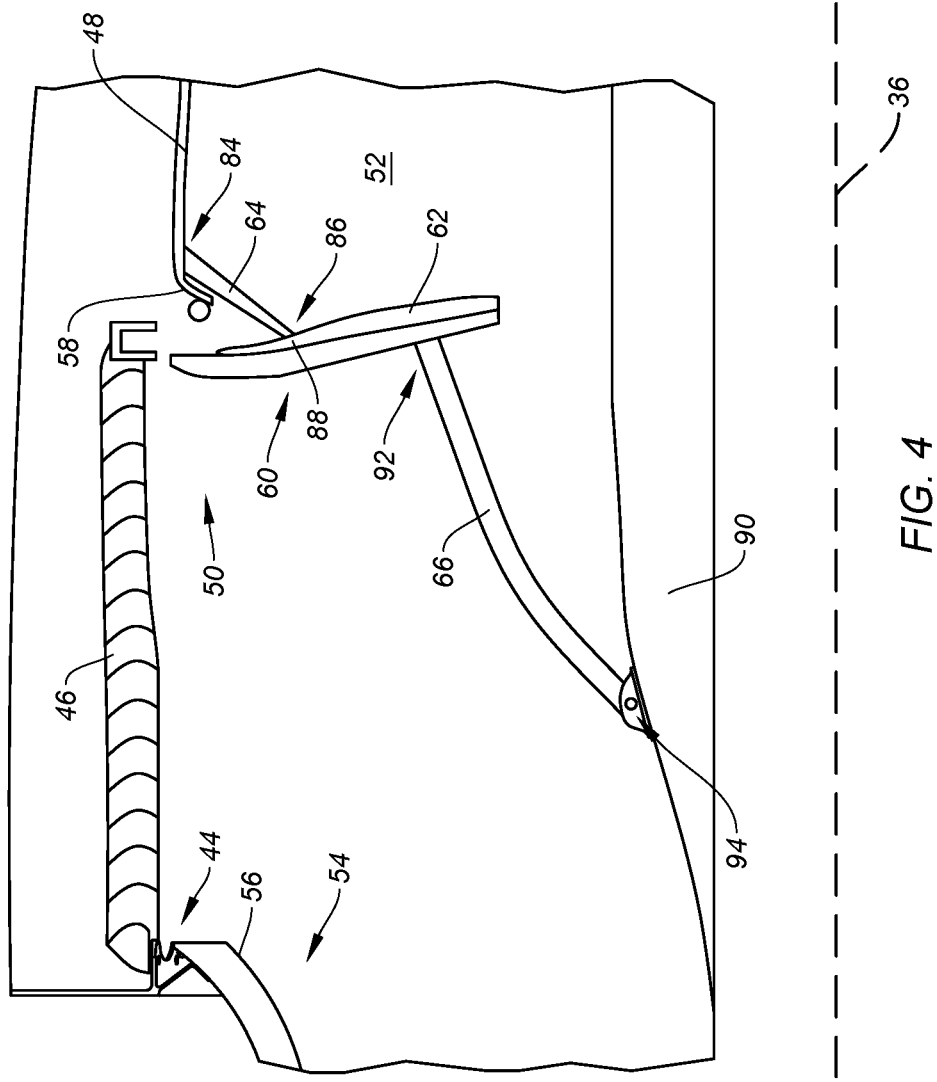
FIG. 4 illustrates a cutaway view of a portion of the thrust reverser of FIG. 3 with the translating sleeve in a deployed position, in accordance with one or more embodiments of the present disclosure.

Referring to FIGS. 3 and 4, the thrust reverser 42 may be configured as a cascade-type thrust reverser. The thrust reverser 42 of FIG. 3 includes a torque box 44, a plurality of cascade elements 46, a translating sleeve 48, and a blocker door assembly 50. The thrust reverser 42 surrounds and forms a thrust reverser duct 52 configured to receive and direct air flow (e.g., bypass air flow) from the gas turbine engine 22 to provide thrust for the propulsion system 20 (see FIGS. 1 and 2).

The torque box 44 forms a portion of a fixed structure of the thrust reverser 42. The torque box 44 mounts (e.g., structurally connects) the components of the thrust reverser 42 to the gas turbine engine 22 (e.g., the engine static structure 34). The torque box 44 includes a downstream wall 54 (sometimes referred to as a "bull nose" or a "bull nose fairing"). The downstream wall 54 extends circumferentially about (e.g., completely around) the axial centerline 36. The downstream wall 54 may slope radially outward in an axially forward to axially aft direction. The downstream wall 54 forms an outer surface 56 facing the blocker door assembly 50. The outer surface 56 may be a curved outer surface (e.g., a convex outer surface) as shown, for example, in FIG. 3.

The cascade elements 46 are disposed between (e.g., radially between) the thrust reverser duct 52 and an exterior of the nacelle 24. The cascade elements 46 extend from the torque box 44 in an axially aftward direction. The cascade elements 46 may be arranged about the axial centerline 36 as a circumferential array of cascade elements 46. The cascade elements 46 may include a plurality of cascade vanes or other airflow directing structures configured to direct air from the thrust reverser duct 52 out of the propulsion system 20 and in an at least partially axially forward direction to provide reverse thrust for the propulsion system 20 (see FIGS. 1 and 2).

The translating sleeve 48 extends circumferentially about (e.g., completely around) the axial centerline 36. The translating sleeve 48 forms and circumscribes the thrust reverser duct 52. The translating sleeve 48 further circumscribes the blocker door assembly 50. The translating sleeve 48 may be formed by a single tubular body or a plurality of circumferential sleeve segments assembled together to form the translating sleeve 48. The translating sleeve 48 includes an upstream end 58 (e.g., an axially forward end). The translating sleeve 48 may include a seal at (e.g., on, adjacent, or proximate) the upstream end 58, for example, to sealingly engage the downstream wall 54 (e.g., the outer surface 56). The translating sleeve 48 is configured for translation (e.g., axial movement) between a stowed position (e.g., an axially forward position; see FIG. 3), a deployed position (e.g., an axially aft position; see FIG. 4), and intermediate positions between the stowed position and the deployed position.

In the stowed position, the translating sleeve 48 may be disposed between the thrust reverser duct 52 and the cascade elements 46 to direct air flow along the thrust reverser duct 52 and to prevent or impede air flow from the thrust reverser duct 52 through the cascade elements 46. In this stowed position, the upstream end 58 may be disposed at (e.g., on, adjacent, or proximate) the downstream wall 54. In the deployed position, the translating sleeve 48 is positioned (e.g., aft of the stowed position) to allow air flow from the thrust reverser duct 52 to flow through the cascade elements 46. In this deployed position, the upstream end 58 is spaced from (e.g., axially spaced from) the downstream wall 54, for example, downstream of (e.g., axially aft of) the cascade elements 46. The thrust reverser 42 may include one or more actuation systems (not shown) for controlling translation of the translating sleeve 48 between the stowed position and the deployed position. The present disclosure, however, is not limited to any particular actuation system configuration for effecting translation of the translating sleeve 48.

Figure 5:
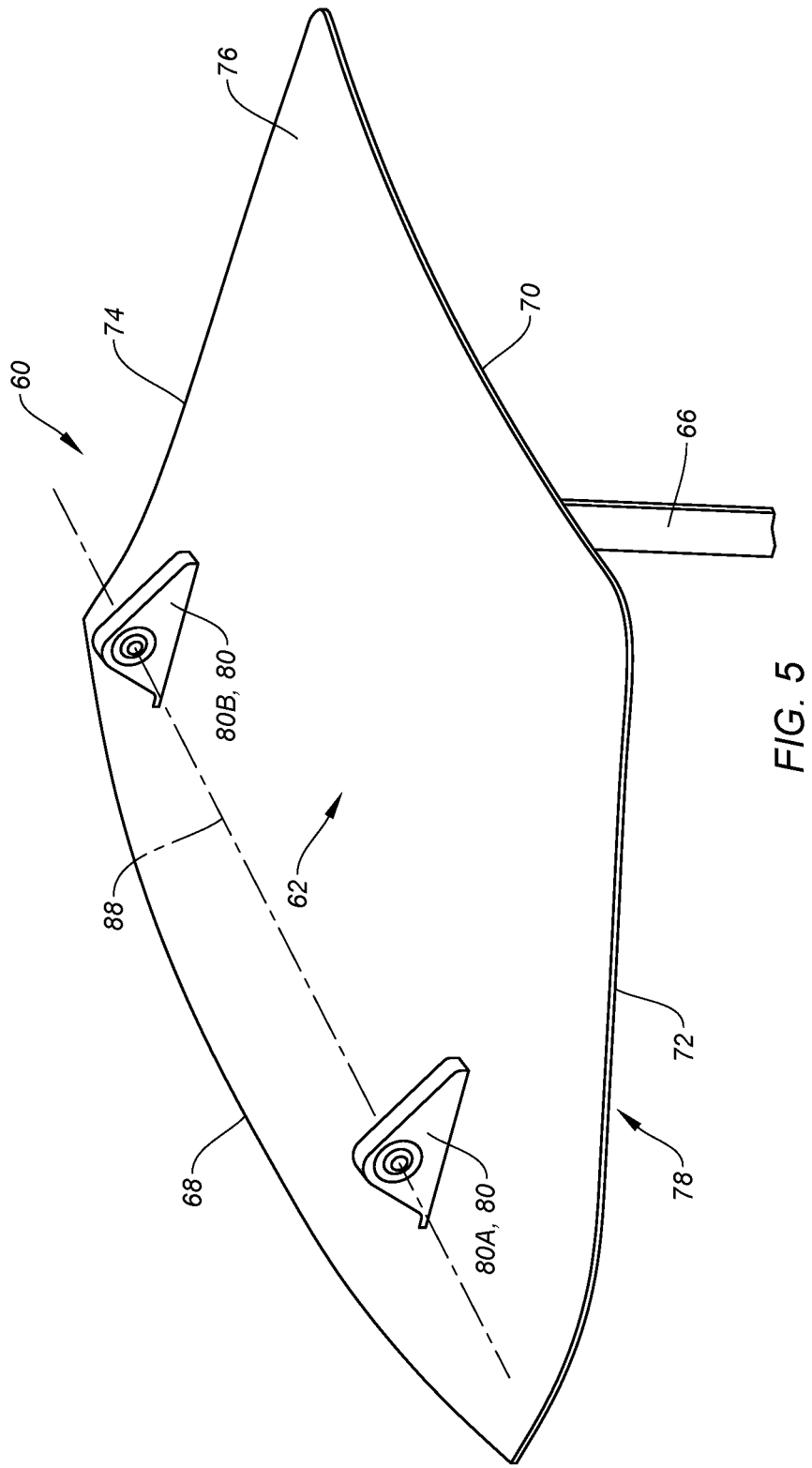
FIG. 5 illustrates a perspective view of a blocker door body for a blocker door of the blocker door assembly of FIG. 3, in accordance with one or more embodiments of the present disclosure.

Referring to FIGS. 3-5, the blocker door assembly 50 includes a plurality of blocker doors 60. The blocker doors 60 are arranged about the axial centerline 36 as a circumferential array of blocker doors 60. The blocker doors 60 are configured for movement with the translating sleeve 48 between the stowed position and the deployed position. Each of the blocker doors 60 includes a blocker door body 62 and at least one hinge 64. Each of the blocker doors 60 may additionally include at least one drag link 66.

The blocker door body 62 extends (e.g., axially extends) between and to an upstream end 68 of the blocker door body 62 and a downstream end 70 of the blocker door body 62. The blocker door body 62 extends between and to a first lateral end 72 of the blocker door body 62 and a second lateral end 74 of the blocker door body 62. The blocker door body 62 extends between and to an outer side 76 (e.g., a radially outer side) of the blocker door body 62 and an inner side 78 (e.g., a radially inner side) of the blocker door body 62. The outer side 76 and the inner side 78 are bounded by the upstream end 68, the downstream end 70, the first lateral end 72, and the second lateral end 74. The blocker door body 62 is configured, for example, as a panel for directing air flow through the thrust reverser duct 52 with the translating sleeve 48 and the blocker doors 60 in the stowed position or directing air flow through the cascade elements 46 with the translating sleeve 48 and the blocker doors 60 in the deployed position. The blocker door body 62 may form or otherwise include one or more mounts 80 for facilitating mounting the blocker door body 62 to the hinge 64. The blocker door body 62 of FIG. 5 includes two mounts 80 for mounting the blocker door body 62 to two respective hinges 64. The present disclosure, however, is not limited the foregoing exemplary configuration or number of the mounts 80 of FIG. 5.

The hinge 64 pivotably mounts the blocker door body 62 to the translating sleeve 48 (e.g., an inner radial side of the translating sleeve 48). The hinge 64 extends between and to a first end 84 of the hinge 64 and a second end 86 of the hinge 64. The first end 84 is mounted (e.g., fixedly mounted) to the translating sleeve 48, for example, at (e.g., on, adjacent, or proximate) the upstream end 58. The second end 86 is pivotably mounted to the blocker door body 62 (e.g., one of the mounts 80) at a hinge line 88 (e.g., a pivot axis). Each of the hinges 64 mounting the blocker door body 62 to the translating sleeve 48 may be pivotably mounted to the blocker door body 62 at the hinge line 88.

The drag link 66 pivotably mounts the blocker door body 62 to the fixed structure of the thrust reverser 42. For example, the drag link 66 of FIGS. 3-4 pivotably mounts the blocker door body 62 to an inner fixed structure (IFS) 90 of the thrust reverser 42. The IFS 90 extends circumferentially about (e.g., completely around) the axial centerline 36. The IFS 90 forms an inner radial boundary of the thrust reverser duct 52 through the thrust reverser 42. The drag link 66 extends between and to a first end 92 of the drag link 66 and a second end 94 of the drag link 66. The first end 92 is mounted (e.g., pivotably mounted) to the blocker door body 62 at (e.g., on, adjacent, or proximate) the inner side 78. The second end 94 is mounted (e.g., pivotably mounted) to the IFS 90.

In operation, the blocker doors 60 are selectively positioned by translation of the translating sleeve 48 between the stowed position and the deployed position. In the stowed position of the translating sleeve 48 and the blocker doors 60, the blocker doors 60 (e.g., the blocker door body 62) may be positioned against the torque box 44 and/or the translating sleeve 48 to direct air flow through the thrust reverser duct 52 as shown, for example, in FIG. 3. The blocker door body 62 may form a portion of an outer radial boundary of the thrust reverser duct 52 through the thrust reverser 42. As the translating sleeve 48 translates from the stowed position to the deployed position, the drag link 66 may control the blocker door body 62 to pivot about the hinge line 88 such that the blocker door body 62 is positioned to obstruct all or at least a substantial portion of the thrust reverser duct 52 (see FIG. 4), thereby directing at least a portion of the air flow from the thrust reverser duct through the cascade elements 46.

During operation of the propulsion system 20 (see FIG. 1), air flow through the thrust reverser duct 52 may impart substantial vibration and other stresses on components of the blocker door assembly 50 and the translating sleeve 48. In at least some conventional blocker door assemblies, the failure (e.g., fracture, detachment, etc.) of a hinge due to these stresses may result in the loss (e.g., departure) of a blocker door (e.g., a blocker door body). For example, the failure of a hinge may lead to air scooping at the upstream end 68 of the blocker door body 62 with the translating sleeve 48 and the blocker door 60 in the stowed position, thereby leading to detachment and departure of the blocker door 60.

Referring to FIGS. 6-9, each of the blocker doors 60 includes at least one blocker door retention assembly 96. The blocker door retention assembly 96 is configured to facilitate secure retention of the blocker doors 60 to the translating sleeve 48 at least in the stowed position of the blocker doors 60 and the translating sleeve 48. For example, the blocker door retention assembly 96 facilitates retention of the blocker doors 60 in the event of a single-point failure of the thrust reverser 42 structure such as, but not limited to, a failed hinge 64, a failed mount 80, or another structural failure of the blocker door 60 load path (e.g., a failed condition of the blocker door 60), with the blocker doors 60 and the translating sleeve 48 in the stowed position.

Figure 6:
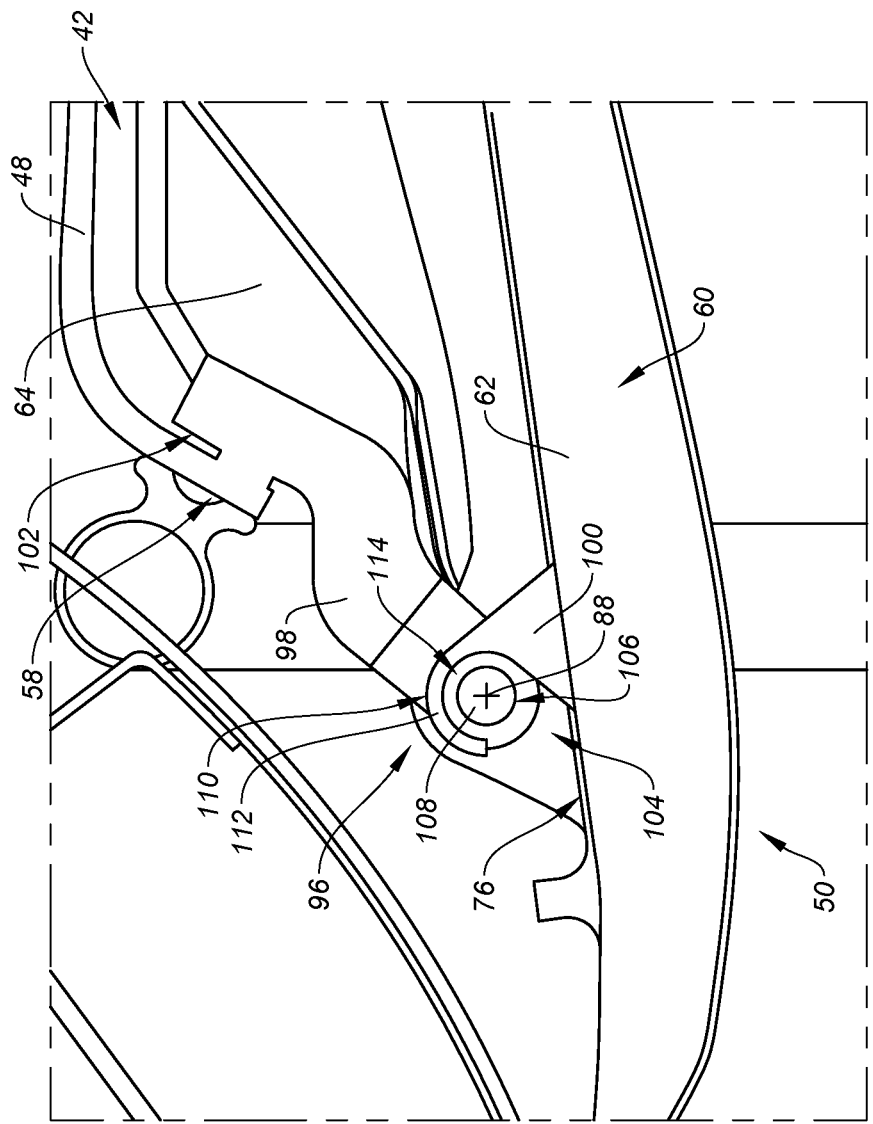
FIG. 6 illustrates a cutaway, side view of a blocker door of the blocker door assembly of FIG. 3 including a blocker door retention assembly, in accordance with one or more embodiments of the present disclosure.
Figure 7:
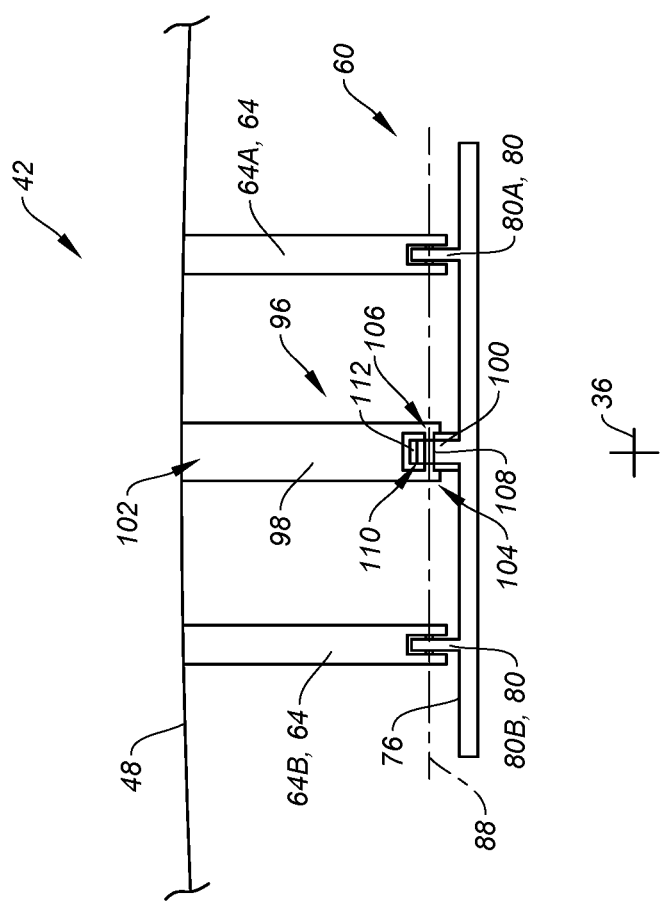
FIG. 7 illustrates a cutaway, front view of the blocker door of FIG. 6, in accordance with one or more embodiments of the present disclosure.

Referring to FIGS. 6 and 7, the blocker door retention assembly 96 is shown for one of the blocker doors 60. FIG. 6 illustrates a cutaway, side view of the blocker door retention assembly 96 with the translating sleeve 48 and the blocker door 60 in the stowed position. FIG. 7 illustrates a cutaway front view of the blocker door retention assembly 96 with the translating sleeve 48 and the blocker door 60 in the stowed position. The blocker door 60 of FIG. 7 includes a single blocker door retention assembly 96, however, the blocker door 60 may alternatively include a plurality of blocker door retention assemblies 96. The blocker door retention assembly 96 of FIGS. 6 and 7 includes a first retention body 98 and a second retention body 100.

The first retention body 98 extends between and to a first end 102 of the first retention body 98 and a second end 104 of the first retention body 98. The first end 102 is mounted (e.g., fixedly mounted) to or otherwise disposed at (e.g., on, adjacent, or proximate) the translating sleeve 48 at (e.g., on, adjacent, or proximate) the upstream end 58. The first retention body 98 is disposed between (e.g., circumferentially between) the hinges 64. For example, the first retention body 98 of FIGS. 6 and 7 is circumferentially centered between a first lateral hinge 64A of the hinges 64 and a second lateral hinge 64B of the hinges 64. The present disclosure, however, is not limited to this particular position of the first retention body 98 relative to the hinges 64. The first retention body 98 may be cantilevered in the forward direction, as shown in FIG. 6, such that the second end 104 is disposed at (e.g., on, adjacent, or proximate) the hinge line 88 and axially forward of the first end 102. The first retention body 98 includes a first retention member 106 at (e.g., on, adjacent, or proximate) the second end 104. The first retention member 106 is disposed at (e.g., on, adjacent, or proximate) the hinge line 88. The first retention member 106 is configured to engage the second retention body 100. For example, the first retention member 106 of FIGS. 6 and 7 is configured as a pin 108 extending lengthwise along the hinge line 88.

The second retention body 100 may be mounted (e.g., fixedly mounted) to the blocker door body 62 on the outer side 76. Alternatively, the second retention body 100 may be integrally formed with the blocker door body 62 (e.g., the blocker door body 62 and the second retention body 100 may be a unitary component). The second retention body 100 is disposed between (e.g., circumferentially between) the mounts 80. For example, the second retention body 100 of FIGS. 6 and 7 is circumferentially centered between a first lateral mount 80A of the mounts 80 and a second lateral mount 80B of the mounts 80. The present disclosure, however, is not limited to this particular position of the second retention body 100 relative to the mounts 80. The second retention body 100 includes a second retention member 110. The second retention member 110 is configured to engage the first retention body 98 (e.g., the first retention member 106). For example, the second retention member 110 of FIGS. 6 and 7 is configured as a hook 112 which curves about the hinge line 88. The hook 112 extends circumferentially about (e.g., partially around) the hinge line 88 and the pin 108. The hook 112 is spaced from the first retention member 106 (e.g., the pin 108) by a gap 114. For example, the hook 112 may be spaced from the first retention member 106 by the gap 114 along the entire hook 112 such that the hook 112 does not contact the first retention member 106 during normal operation of the blocker door 60.

In operation, as the blocker door body 62 pivots about the hinge line 88 between the stowed position and the deployed position, the second retention member 110 may remain spaced from the first retention member 106 by the gap 114. In other words, in an unfailed condition (e.g., a normal operating condition) of the blocker door 60, the second retention member 110 may remain spaced from the first retention member 106 by the gap 114. A distance of the gap 114 may be selected, for example, to accommodate component manufacturing tolerances and operational deflections of components of the thrust reverser 42 (e.g., the translating sleeve 48 and the blocker door assembly 50) such that the second retention member 110 generally does not contact the first retention member 106 during normal operation of the translating sleeve 48 and the blocker door 60. In the event of a failure of one of the hinges 64, one of the mounts 80, or another structural failure of the blocker door 60 load path (e.g., a failure condition of the blocker door 60) the second retention member 110 (e.g., the hook 112) may contact the first retention member 106 (e.g., the pin 108) for the stowed position of the blocker door 60. The first retention member 106 may, therefore, support (e.g., hold) the blocker door body 62 in the stowed position with the translating sleeve 48 subsequent to the failure condition. Subsequent operation of the thrust reverser 42 to provide reverse thrust for the propulsion system 20 (see FIG. 1), for example, during an aircraft landing operation, will cause the blocker door body 62 to pivot about the hinge line 88 as the translating sleeve 48 translates in the axially aft direction. The pivoting of the blocker door body 62 about the hinge line 88 may facilitate separation of the second retention member 110 from the first retention member 106, and may result in distortion of the blocker door 60 hardware (e.g., the hinges 64, the mounts 80, etc.). In some cases, all or portions of the blocker door 60 (e.g., the blocker door body 62) may become detached from and may depart from the thrust reverser 42 and its translating sleeve 48. Failure of the blocker door 60, for example, by deformation or departure or all or portions of the blocker door 60, render the blocker door 60 failure detectable (e.g., observable) upon performance of a walk-around or other visual inspection prior to the next flight. The loss of all or portions of the blocker door 60 may subsequently be identified by a maintenance crew (e.g., after the aircraft landing operation).

Figure 8:
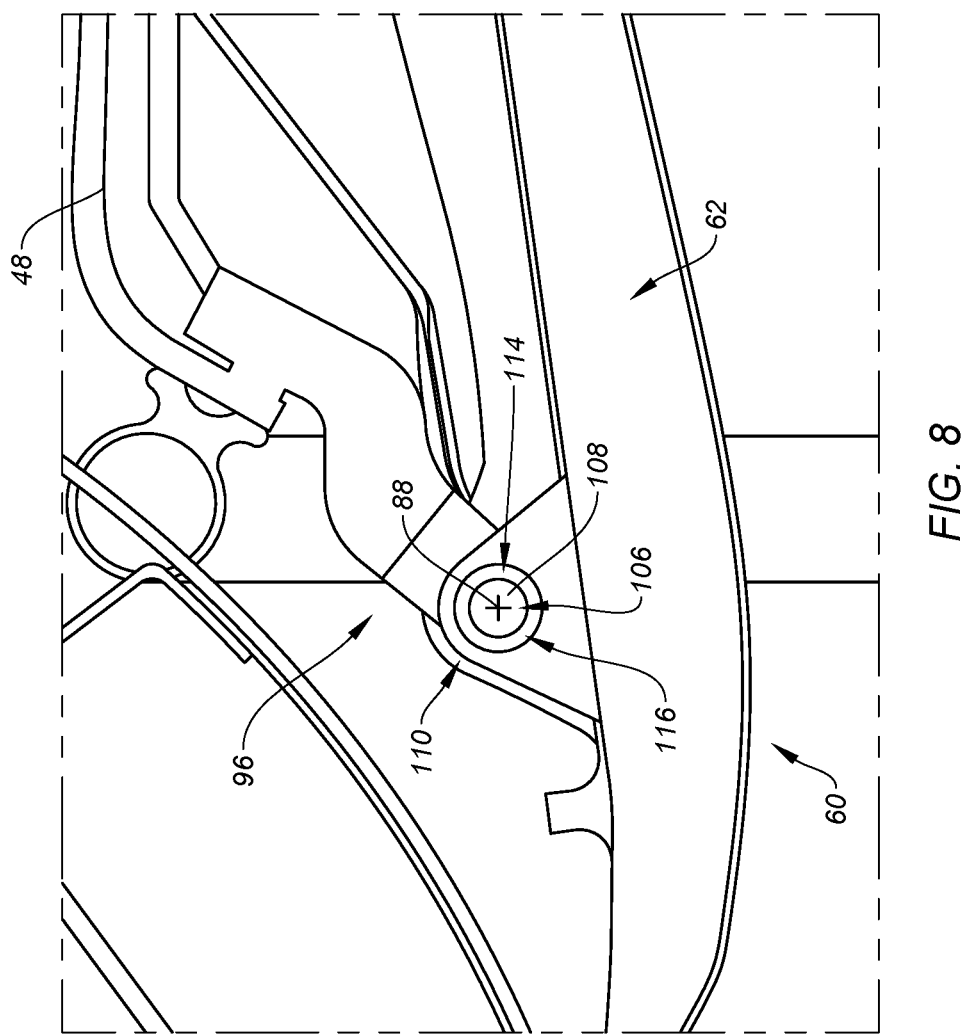
FIG. 8 illustrates a cutaway, side view of a blocker door of the blocker door assembly of FIG. 3 including another blocker door retention assembly, in accordance with one or more embodiments of the present disclosure.

Referring to FIG. 8, the second retention member 110 may alternatively surround the first retention member 106 (e.g., the pin 108) along the hinge line 88. FIG. 8 illustrates a cutaway, side view of the blocker door retention assembly 96 with the translating sleeve 48 and the blocker door 60 in the stowed position. The second retention member 110 extends circumferentially about (e.g., completely around) the hinge line 88 to form an aperture 116 along the hinge line 88. The first retention member 106 is disposed within the aperture 116 and separated from the second retention member 110 within the aperture 116 by the gap 114. A distance of the gap 114 may be selected, for example, to accommodate component manufacturing tolerances and operational deflections of components of the thrust reverser 42 (e.g., the translating sleeve 48 and the blocker door assembly 50) such that the second retention member 110 generally does not contact the first retention member 106 during normal operation of the translating sleeve 48 and the blocker door 60. In operation, as the blocker door body 62 pivots about the hinge line 88 between the stowed position and the deployed position, the second retention member 110 may remain spaced from the first retention member 106 within the aperture 116 by the gap 114. In other words, in an unfailed condition (e.g., a normal operating condition) of the blocker door 60, the second retention member 110 may remain spaced from the first retention member 106 by the gap 114. In the event of a failure of one of the hinges 64, one of the mounts 80, or another structural failure of the blocker door 60 load path (e.g., a failed condition of the blocker door 60) the second retention member 110 may contact the first retention member 106 (e.g., the pin 108), thereby allowing the blocker door 60 to operate normally to pivot about the hinge line 88 between the stowed position and the deployed position, for example, until the failure condition is identified by a visual inspection. The first retention member 106 may, therefore, support (e.g., hold) the blocker door body 62 in position relative to the translating sleeve 48 in both the stowed position and the deployed position of the translating sleeve 48 and the blocker door 60.

Figure 9:
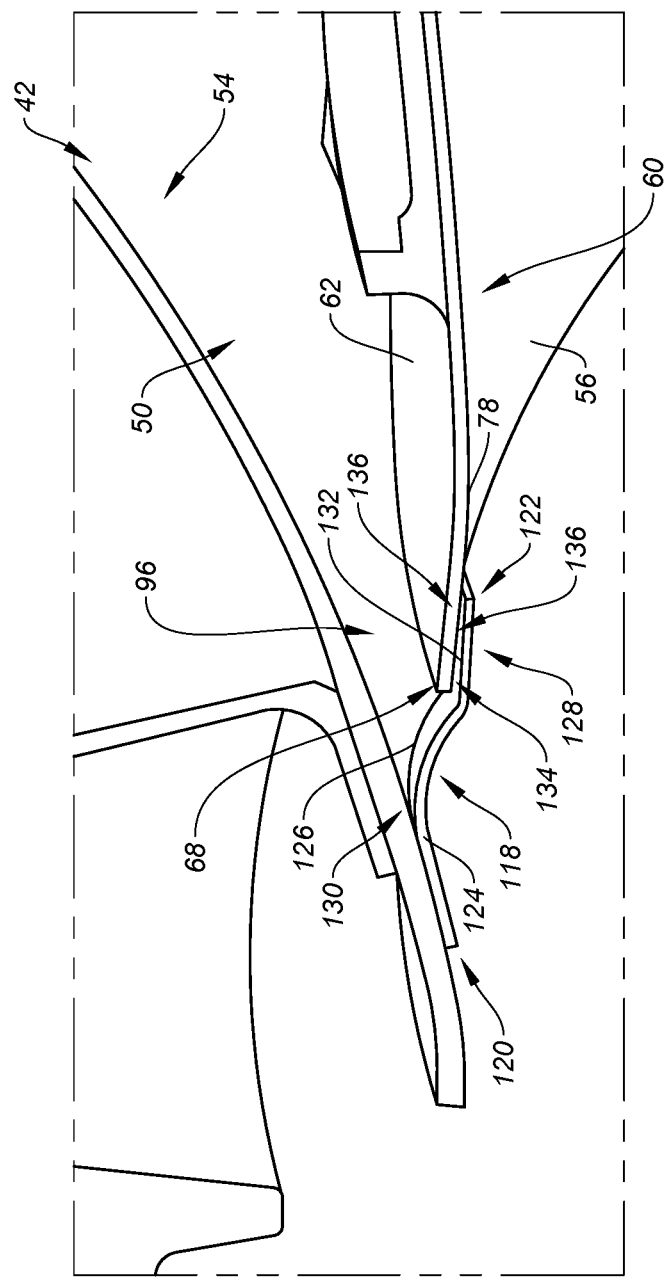
FIG. 9 illustrates a cutaway, perspective view of a blocker door of the blocker door assembly of FIG. 3 including another blocker door retention assembly, in accordance with one or more embodiments of the present disclosure.

Referring to FIG. 9, another embodiment of the blocker door retention assembly 96 is shown for one of the blocker doors 60. FIG. 9 illustrates a cutaway, perspective view of the blocker door retention assembly 96 with the translating sleeve 48 (see FIGS. 3, 6, and 8) and the blocker door 60 in the stowed position. The blocker door 60 of FIG. 9 includes a single blocker door retention assembly 96, however, the blocker door 60 may alternatively include a plurality of blocker door retention assemblies 96.

The blocker door retention assembly 96 of FIG. 9 includes a first retention body 118 and a second retention body 136. The first retention body 118 is configured as a narrow axially-extending panel. The first retention body 118 extends (e.g., axially extends) between and to a first end 120 of the first retention body 118 and a second end 122 of the first retention body 118. The first retention body 118 extends (e.g., circumferentially extends) between a first lateral side 124 of the first retention body 118 and a second lateral side 126 of the first retention body 118. The first retention body 118 is mounted (e.g., fixedly mounted) to the downstream wall 54 (e.g., the outer surface 56) at (e.g., on, adjacent, or proximate) the first end 120. The first retention body 118 is mounted to the downstream wall 54 at (e.g., on, adjacent, or proximate) a radial position of the blocker door body 62 with the blocker door 60 in the stowed position. The first retention body 118 is mounted to the downstream wall 54 at a circumferential position of the blocker door body 62, for example, circumferentially between the hinges 64 (e.g., the first lateral hinge 64A or the second lateral hinge 64B; see FIG. 7). The second end 122 is disposed axially aft of the first end 120. The first retention body 118 may include one or both of a retention axial portion 128 and a curved axial portion 130. The retention axial portion 128 is disposed at the second end 122. The retention axial portion 128 forms a retention surface 132 facing radially outward. The retention surface 132 may be flat or substantially flat and may generally extend in an axial direction. The retention surface 132 is configured to engage the second retention body 136. The curved axial portion 130 may be disposed at (e.g., on, adjacent, or proximate) the retention axial portion 128. The curved axial portion 130 may be configured with a concave curvature facing the axial centerline 36 (see, e.g., FIG. 3). The blocker door body 62 forms the second retention body 136. For example, the blocker door body 62 forms the second retention body 136 at (e.g., on, adjacent, or proximate) the upstream end 68 and along the inner side 78.

In the stowed position of the translating sleeve 48 (see FIGS. 3, 6, and 8) and the blocker door 60, the second retention body 136 is disposed radially outward of and axially overlaps the retention surface 132. For example, the upstream end 68 may be disposed axially forward of the second end 122. The second retention body 136 is spaced from the retention surface 132 by a gap 134. In other words, in an unfailed condition (e.g., a normal operating condition) of the blocker door 60, the second retention member 136 may remain spaced from the first retention member 118 by the gap 134. A distance of the gap 134 may be selected, for example, to accommodate component manufacturing tolerances and operational deflections of components of the thrust reverser 42 (e.g., the translating sleeve 48 and the blocker door assembly 50) such that the second retention body 136 generally does not contact the retention axial portion 128 (e.g., the retention surface 132) during normal operation of the translating sleeve 48 and the blocker door 60. The blocker door body 62 (e.g., the second retention body 136) may translate in proximity to the retention axial portion 128, separated by the gap 134, as the blocker door 60 moves between the stowed position and the deployed position with the translating sleeve 48. In the event of a failure of one of the hinges 64 one of the mounts 80, or another structural failure of the blocker door 60 load path (see, e.g., FIGS. 3 and 4) (e.g., a failure condition of the blocker door 60) the second retention body 136 may contact the retention axial portion 128 (e.g., the retention surface 132) for the stowed position of the blocker door 60. The retention axial portion 128 may, therefore, retain (e.g., hold) the blocker door body 62 in the stowed position with the translating sleeve 48 subsequent to the failure condition. Subsequent operation of the thrust reverser 42 to provide reverse thrust for the propulsion system 20 (see FIG. 1), for example, during an aircraft landing operation, will cause the blocker door body 62 to pivot about the hinge line 88 as the translating sleeve 48 translates in the axially aft direction. The pivoting of the blocker door body 62 about the hinge line 88 (see e.g., FIGS. 3 and 4) facilitates separation of the second retention body 136 from the retention axial portion 128, and all or portions of the blocker door 60 (e.g., the blocker door body 62) may become detached from and may depart from the thrust reverser 42 and its translating sleeve 48. The loss of all or portions of the blocker door 60 may subsequently be identified by a maintenance crew (e.g., after the aircraft landing operation). The relatively narrow width of the first retention body 118 between the first lateral side 124 and the second lateral side 126 as well as the curvature of the curved axial portion 130 facilitates a reduction in the resistance to air flow directed through the cascade elements 46 during thrust reversal.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A thrust reverser for an aircraft propulsion system, the thrust reverser comprising:

a fixed thrust reverser structure, the fixed thrust reverser structure includes a wall extending circumferentially about an axis of the thrust reverser;

a translating sleeve extending circumferentially about the axis to form a thrust reverser duct of the thrust reverser, the translating sleeve is configured to translate between a first stowed translating sleeve position and a second translating sleeve position, the translating sleeve includes an upstream end, and the upstream end is disposed at the wall with the translating sleeve in the first stowed translating sleeve position; and a blocker door assembly including a plurality of blocker doors, each blocker door of the plurality of blocker doors includes a blocker door body, a first lateral hinge, a second lateral hinge, and a blocker door retention assembly, the blocker door body is pivotably mounted to the translating sleeve by the first lateral hinge and the second lateral hinge, the blocker door body is pivotable about a hinge line of the first lateral hinge and the second lateral hinge between a first stowed blocker door position and a second blocker door position, translation of the translating sleeve from the first stowed translating sleeve position to the second translating sleeve position effects pivoting of the blocker door body from the first stowed blocker door position to the second blocker door position, the blocker door retention assembly includes a first retention body fixedly mounted to the wall or to the translating sleeve, the first retention body is disposed circumferentially between the first lateral hinge and the second lateral hinge, and the first retention body is configured to support the blocker door body in the first stowed blocker door position.

2. The thrust reverser of claim 1, wherein the first retention body is configured to release the blocker door body in the second blocker door position.

3. The thrust reverser of claim 1, wherein the first retention body is fixedly mounted to the translating sleeve, the blocker door retention assembly further includes a second retention body fixedly mounted to the blocker door body, and the first retention body is configured to engage the second retention body with the blocker door body in the first stowed blocker door position.

4. The thrust reverser of claim 3, wherein, with the blocker door body in the first stowed blocker door position, the second retention body is spaced from the first retention body by a gap.

5. The thrust reverser of claim 4, wherein the first retention body includes a pin and the second retention body extends about the pin with the blocker door body in the first stowed blocker door position.

6. The thrust reverser of claim 5, wherein the pin extends along the hinge line.

7. The thrust reverser of claim 5, wherein the second retention body includes a hook extending about the pin and spaced from the pin by the gap.

8. The thrust reverser of claim 5, wherein the second retention body surrounds the pin.

9. The thrust reverser of claim 1, wherein the first retention body is fixedly mounted to the wall at a radial position of the blocker door body in the first stowed blocker door position, and the first retention body is configured to engage the blocker door body with the blocker door body in the first stowed blocker door position.

10. The thrust reverser of claim 9, wherein the first retention body extends between and to a first end and a second end, the first end is fixedly mounted to the wall, the first retention body includes a retention axial portion at the second end, and the retention axial portion is spaced from the blocker door body by a gap with the blocker door body in the first stowed blocker door position.

11. The thrust reverser of claim 1, further comprising an inner fixed structure forming an inner radial boundary of the thrust reverser duct, wherein each blocker door of the plurality of blocker doors further includes a drag link pivotably mounted to the inner fixed structure and the blocker door body.

12. A thrust reverser for an aircraft propulsion system, the thrust reverser comprising:
 a torque box, the torque box includes a wall extending circumferentially about an axis of the thrust reverser;
 a translating sleeve disposed aft of the torque box, the translating sleeve is configured to translate between a forward translating sleeve position and an aft translating sleeve position; and
 a blocker door assembly including a plurality of blocker doors, each blocker door of the plurality of blocker doors includes a blocker door body, at least one hinge, and a blocker door retention assembly, the blocker door body is pivotably mounted to the translating sleeve by the at least one hinge, the blocker door body is pivotable about a hinge line of the at least one hinge between a first stowed blocker door position and a second blocker door position, translation of the translating sleeve from the first stowed translating sleeve position to the second translating sleeve position effects pivoting of the blocker door body from the first stowed blocker door position to the second blocker door position, the blocker door retention assembly includes a first retention body and a second retention body, the first retention body is fixedly mounted to the translating sleeve, the second retention body is fixedly mounted to the blocker door body, and the first retention body is configured to engage the second retention body to support the blocker door body in the first stowed blocker door position.

13. The thrust reverser of claim 12, wherein the first retention body extends between and to a first end and a second end, the first end is fixedly mounted to the translating sleeve, and the second end is disposed at the hinge line.

14. The thrust reverser of claim 13, wherein the second end is disposed axially forward of the first end.

15. The thrust reverser of claim 13, wherein the first retention body is mounted to the translating sleeve at an upstream end of the translating sleeve.

16. The thrust reverser of claim 13, wherein the first retention body is spaced from the second retention body by a gap with the blocker door body in the first stowed blocker door position.

17. The thrust reverser of claim 13, wherein the first retention body includes a pin at the second end, the pin extends along the hinge line, and the pin is configured to engage the second retention body to support the blocker door body in the first stowed blocker door position.

18. A thrust reverser for an aircraft propulsion system, the thrust reverser comprising:
 a fixed thrust reverser structure, the fixed thrust reverser structure includes a wall extending circumferentially about an axis of the thrust reverser;
 a translating sleeve extending circumferentially about the axis to form a thrust reverser duct of the thrust reverser, the translating sleeve is configured to translate between a first stowed translating sleeve position and a second translating sleeve position, the translating sleeve includes an upstream end, and the upstream end is disposed at the wall with the translating sleeve in the first stowed translating sleeve position; and
 a blocker door including a blocker door body, at least one hinge, and one or more blocker door retention assemblies, the blocker door body is pivotably mounted to the translating sleeve by the at least one hinge, the blocker door body is pivotable about a hinge line of the at least one hinge between a first stowed blocker door position and a second blocker door position, translation of the translating sleeve from the first stowed translating sleeve position to the second translating sleeve position effects pivoting of the blocker door body from the first stowed blocker door position to the second blocker door position, each of the blocker door retention assemblies includes a first retention body and a second retention body, the first retention body is fixedly mounted to the wall or to the translating sleeve, the blocker door body includes the second retention body, and the first retention body is configured to support the blocker door body such that:
 in an unfailed condition of the blocker door, the first retention body is spaced from the second retention body by a gap for the first stowed blocker door position and the second blocker door position; and
 in a failed condition of the blocker door, the first retention body contacts the second retention body for the first stowed blocker door position.

19. The thrust reverser of claim 18, wherein in the failed condition of the blocker door, the first retention body is configured to release the second retention body in the second blocker door position.

* * * * *